United States Patent [19]
Zar

[11] 3,740,593
[45] June 19, 1973

[54] SUPERCONDUCTIVE MAGNETS USED IN MAGNETOHYDRODYNAMIC DEVICES

[75] Inventor: Jacob L. Zar, North Andover, Mass.

[73] Assignee: Avco Corporation, Cincinnatti, Ohio

[22] Filed: Dec. 27, 1971

[21] Appl. No.: 212,004

[52] U.S. Cl. .................................. 310/11, 335/216
[51] Int. Cl. ............................................. H02n 3/00
[58] Field of Search ............... 310/10, 11; 335/216; 417/50

[56] References Cited
UNITED STATES PATENTS

| | | | |
|---|---|---|---|
| 3,391,288 | 7/1968 | Kafka | 310/11 |
| 3,280,350 | 10/1966 | Gebel | 310/11 |
| 3,319,106 | 5/1967 | Hertz | 310/11 UX |
| 3,320,443 | 5/1967 | Klein | 310/11 |

*Primary Examiner*—D. F. Duggan
*Attorney*—Charles M. Hogan and Melvin E. Frederick

[57] ABSTRACT

A magnetohydrodynamic generator is shown in which a superconductive magnet is employed to create a magnetic field normal to the direction of flow of a high temperature, conductive gas stream. The magnet comprises opposed coils embraced by U-shaped iron frames which essentially neutralize the forces of attraction and repulsion created in these coils. The coils are mounted in Dewars, the inner casings and outer casings of which are interconnected by a spoke rod system which minimizes heat losses of liquid helium which is circulated through the inner casings to maintain the coils in a super cooled condition.

8 Claims, 4 Drawing Figures

Patented June 19, 1973 3,740,593

JACOB L. ZAR
INVENTOR.

BY Charles M. Hogan
Melvin E. Frederick
ATTORNEYS

Patented June 19, 1973 3,740,593

JACOB L ZAR
INVENTOR.

BY Charles M. Hogan
Melvin E. Frederick
ATTORNEYS

SUPERCONDUCTIVE MAGNETS USED IN MAGNETOHYDRODYNAMIC DEVICES

The present invention relates to improvements in the control of magnetic fields, particularly in superconductive magnets employed in magnetohydrodynamic (hereinafter MHD) devices and specifically MHD generators.

The motivating environment for the present invention is found in MHD generators. Such generators, well known in basic principle, offer a great potential for the generation of electricity with a minimum of polution and at economical costs. In simplified terms, the mode of operation of an MHD generator is to pass an ionized fluid through a magnetic field which is normal to the direction of fluid flow. This generates an electrical potential between opposed electrodes on opposite sides of the fluid flow path. For efficient operation, the ionized fluid is generally a high temperature gas, 2500° K, flowing at high velocities, usually supersonic. Additionally, acceptable levels of efficiency require magnetic fields of extremely high strength, e.g., 25 kilogauss or more.

The latter requirement has led to proposals for employing superconductive magnets to obtain the desired field strengths. Superconductive magnets, per se, are well known. Operating at extremely low temperatures, in a liquified gas such as helium, they are extremely efficient in generating high strength magnetic fields with only minimal heat generation. This basic efficency, however, is compromised by the refrigeration requirements for maintaining their low temperature operating environment.

This becomes particularly significant in an MHD generator where the coils of the superconducting magnet must be necessarily disposed closely adjacent, or contiguous, to the hot gas stream flow path. The heat losses, and consequent increases in refrigeration requirements, attributable to such juxtaposition are further increased by the large forces of attraction and repulsion generated between the coils, and portions thereof, of such high strength, superconducting magnets. In conventional magnets of this type, these forces must be taken by relatively large structural members to properly support the coils of the magnet. These supporting structures, due to their large mass, provide heat flow paths which increase the heat losses of the super cooled coils of the magnet and seriously reduce its overall efficiency as well as the efficiency of the MHD generator.

Another problem associated with MHD generators is found in cooling the hot gas channel and in making electrical connections thereto, taking into account the structure of the magnet associated therewith.

Accordingly, one object of the invention is to minimize the forces of repulsion and attraction between the coils of a superconducting magnet and thus reduce the mass of the supporting structure therefor and thus reduce refrigeration requirements and increase overall efficiency of the magnet.

Ancillary to the above object, a further object of the invention is to increase the overall efficiency of MHD generators and also to facilitate the provision of cooling requirements of the hot gas channel and electrical connections therewith.

In the broader aspects of the present invention the above ends are attained by a magnet construction wherein opposed coils are embraced by frame means of U-shaped cross section into which are induced magnetic poles which neutralize, or substantially minimize, the magnetic polar forces between the coils.

In another aspect of the invention, the above ends are attained in a magnetic field generator for an MHD electrical generation system. Further, in such a system, the flow of the electrically conductive fluid may be along a linear channel. In this case the frame means comprise a pair of U-shaped frames extending lengthwise of the channel and respectively embracing runs of the coils which are parallel to the channel. With this combination, advantageous operation is attained by mounting the coils within double walled Dewars so that they may be cooled to more efficiently generate the magnetic field. The inner casing of each Dewar, containing a coil immersed in liquid helium or the like, is connected to the outer casing thereof by a spoke rod system which provides an elongated heat conduction flow path to minimize heat losses to the cooled magnet coils.

Other aspects of the invention are found in mounting features which take forces imposed on the coils or Dewar beyond those contemplated in normal or design point operation. Further, provision is made for access through the frame means to accommodate service lines to the conductive fluid channel as well as to facilitate inspection and limited repair of this channel.

The above and other related objects and features of the invention will be apparent from a reading of the following description of the disclosure found in the accompanying drawings and the novelty thereof pointed out in the appended claims.

Figure 1:
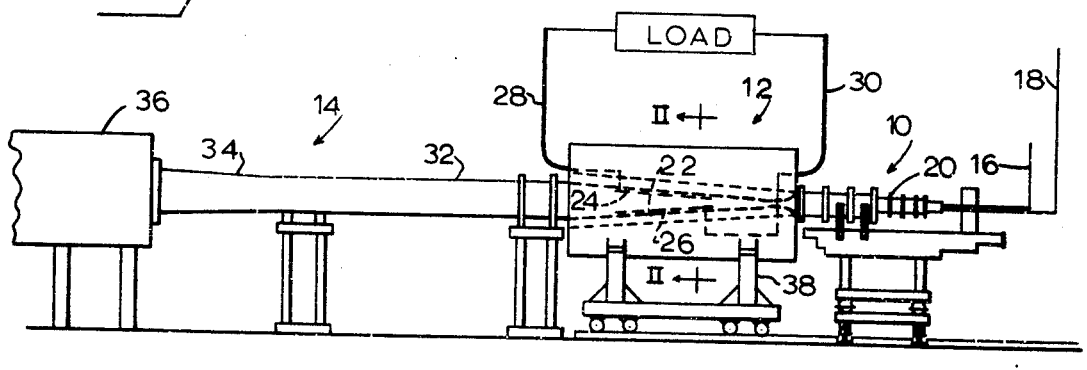
FIG. 1 is an elevation of a MHD generator system incorporating the present invention.

Referencing FIG. 1, a typical MHD generator system is shown, comprising an electrically conductive fluid generator 10, a magnetic field generator 12 through which the fluid passes to generate electricity and an exhaust system 14.

The electrically conductive fluid is, generally, a high temperature ionized gas. The gas can be heated indirectly or generated by combustion, temperatures in excess of 2500° K are preferred. The degree of ionization, a high degree is desirable, can be controlled by the selection of the gas or gasses to be used as well as by the incorporation of seeding materials, all of which is well known to those skilled in the art. For the sake of illustration, FIG. 1 shows conduits 16, 18 which respectively introduce fuel and an oxident into a burner 20.

The conductive gas stream thus generated is discharged from the burner 20 into a channel 22 extending through the magnetic field generator 12. The magnetic generator 12 will be described in greater detail hereinafter, but its basic function, as in other MHD generating systems, is to generate a high strength magnetic field through the fluid channel 22 in a direction normal to the direction of gas flow. This in turn produces a potential between electrodes 24, 26 which may then be connected, by conductors 28, 30 across a load, as indicated, to produce a useful output.

The efficiency of an MHD generating system generally improves as a function of gas velocity through the magnetic field — in most cases gas velocity should be of a supersonic value. The exhaust system 14 therefore comprises a supersonic diffuser section 32, extending from the channel 22, and a subsonic diffuser 34, with the latter opening into an exhaust duct 36.

The gas generator 10 is mounted on wheels for movement laterally. The magnetic field generator 12 is mounted on a dolly 38 for axial movement. Upon disconnecting a limited number of couplings these generators may be disassociated to facilitate maintainence, etc.

Figure 2:
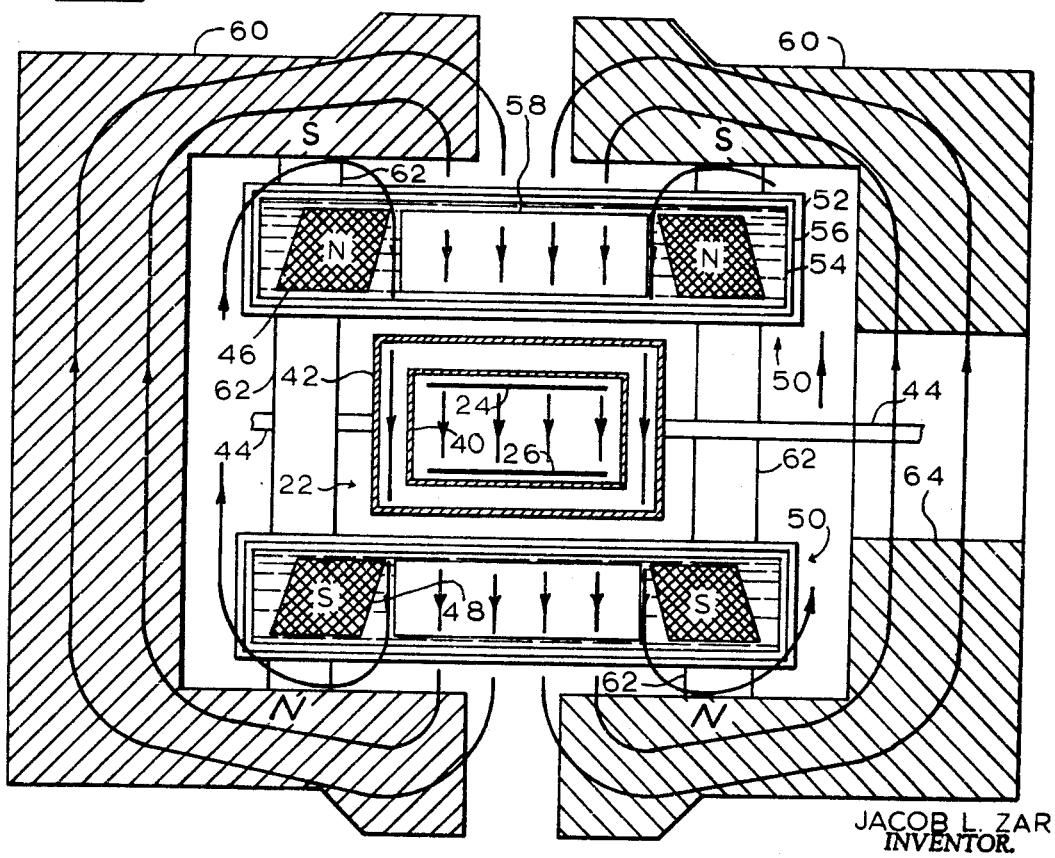
FIG. 2 is a section, on an enlarged scale, taken on line II—II in FIG. 1.
Figure 3:
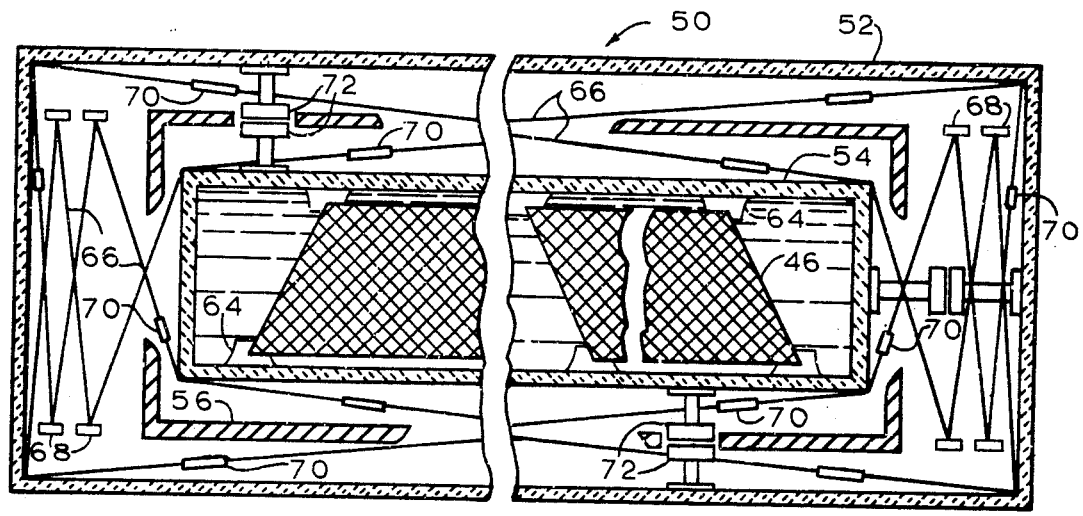
FIG. 3 is a section, with portions broken away, of a portion of FIG. 2.

Referencing now FIGS. 2–4, the magnetic field generator 12 will be described in detail with reference to the novel features of the present invention. The magnetic generator 12 extends along the length of the gas channel 22 and is generally symetrical with respect to the central axis thereof. The channel 22 comprises an inner duct 40, preferably of rectangular cross section, and an outer, spaced casing 42. Provision is made for cooling the channel 22 by way of conduits 44 which carry water or other coolant to and from the space between the duct and the casing. Other conduits (not shown) extend to and through the casing 42 and duct 40 to carry the main conductors 28, 30 as well as instrumentation leads.

Coils 46, 48 are respectively disposed above and below the channel 22, within Dewars 50. The latter may be of identical construction, each comprising outer and inner casings 52, 54 respectively, with a heat shield 56 in the evacuated spacing therebetween. Liquid helium, or the like is circulated through the interiors of the inner casings 54 (through conduits not shown) to maintain the coils 46, 48 in a superconducting condition. An evacuated chamber 58, within each inner casing 54 minimizes the volume of liquid helium required for the cooling function.

The coils 46, 48 are wound of appropriate material for superconductive operation and are essentially identical. Electrical connections are made to an appropriate source of electrical energy to generate, along the length of the channel 22, a magnetic field that is normal to the direction of gas flow and is essentially uniform across the width of the channel, as indicated by the arrows in FIG. 2 and as is more fully explained hereinafter. It will also be noted that the coils 46, 48 have opposed runs disposed parallel to the channel 22, outside the vertical outline thereof, connected by bights crossing over the channel at opposite ends thereof.

The Dewars 50 are supported relative to each other and to a pair of iron frames 60 ny posts 62, or the like, fabricated of non-magnetic material. The frames 60 are, in turn, supported on the dolly 38 seen in FIG. 1. The frames 60 are of U-shaped cross section with their free ends spaced apart from the vertical center line of the channel 22. The bridges of the U-shaped frames may have openings, as at 64, to accommodate service lines for the channel 22, such as the conduits 44, as well as to provide access thereto for limited servicing and inspection.

The frames 60 function to greatly minimize the forces of attraction and repulsion between the coils 46, 48. With coil current flow in the directions schematically indicated in FIG. 2, magnetic poles are created in the opposed runs of the coils, as shown. These poles are effectively neutralized by opposite poles in the adjacent legs of the iron frames 60 due to the magnetic fields which are also created therein. By the use of known calculation procedures, the mass and specific shape of the iron frames can be established so that the polar forces are essentially neutralized during operation of the MHD generator at its design point of operation and substantially minimized at other than design point operation.

It will also be noted that the legs of the U-shaped frames 60 are enlarged along the lengths of their free ends. This feature assists in shaping the magnetic field and obtaining an essentially uniform strength field across the width of the channel 22 and particularly the gas carrying portion thereof.

The greatly reduced forces between the coils 46, 48 provide a significant reduction in the heat losses from the Dewars 50 due to the minimized structural mass required for mounting the coils 46, 48 therein. This can be seen from FIG. 3 which shows that the coil 46 is anchored to the inner casing 54 by spaced lugs 64 so that these two elements may be considered as a single structural unit. This unit is then secured to the outer Dewar casing 52 by a system of spoke rods 66. Horizontal support is provided by spoke rods extending from the corners of the inner casing 54 to the respective far corners of the outer casing 52. The spoke rods are relatively thin and, in the case of horizontal support, are of such a length that they increase the heat conduction path sufficiently to significantly reduce the heat transfer, or heat loss, between the inner and outer casings of the Dewar. The same principles apply to vertical support of the inner casing 52, except that its relatively small height makes preferable the use of intermediate frames 68 between which shorter spokes 66 are angled before ultimately being connected to the corners of the outer casing 52. In this fashion it is again possible to provide a heat conduction path of sufficient length to minimize, to a significant degree, the heat losses between the inner and outer casings of the Dewar. Turnbuckles 70 may be provided in the spokes 66 so that they may be properly tensioned.

The spokes 66, in order that the end of heat loss minimization may be attained, do not have sufficient strength to withstand all of the forces that may be encountered, as in transient operation of the MHD generator system. To prevent stretching or rupturing of the spokes, a series of spaced abutments 72 are provided on the inner and outer casings of the Dewar within the evacuated spacing therebetween. In normal operation opposed abutments 72 are spaced apart and do not provide any substantial conductive path for heat losses. However, when transient forces are introduced, appropriate abutments contact each other, thereby limiting relative movement between the inner and outer casings of the Dewar and preventing the spoke rods 66 from being permanently strained. It will be apparent that the heat shield 56 is appropriately apertured to accommodate the spoke rod system as well as the abutments 72. This has only a minimal effect on the overall insulating capabilities of the Dewar.

Figure 4:
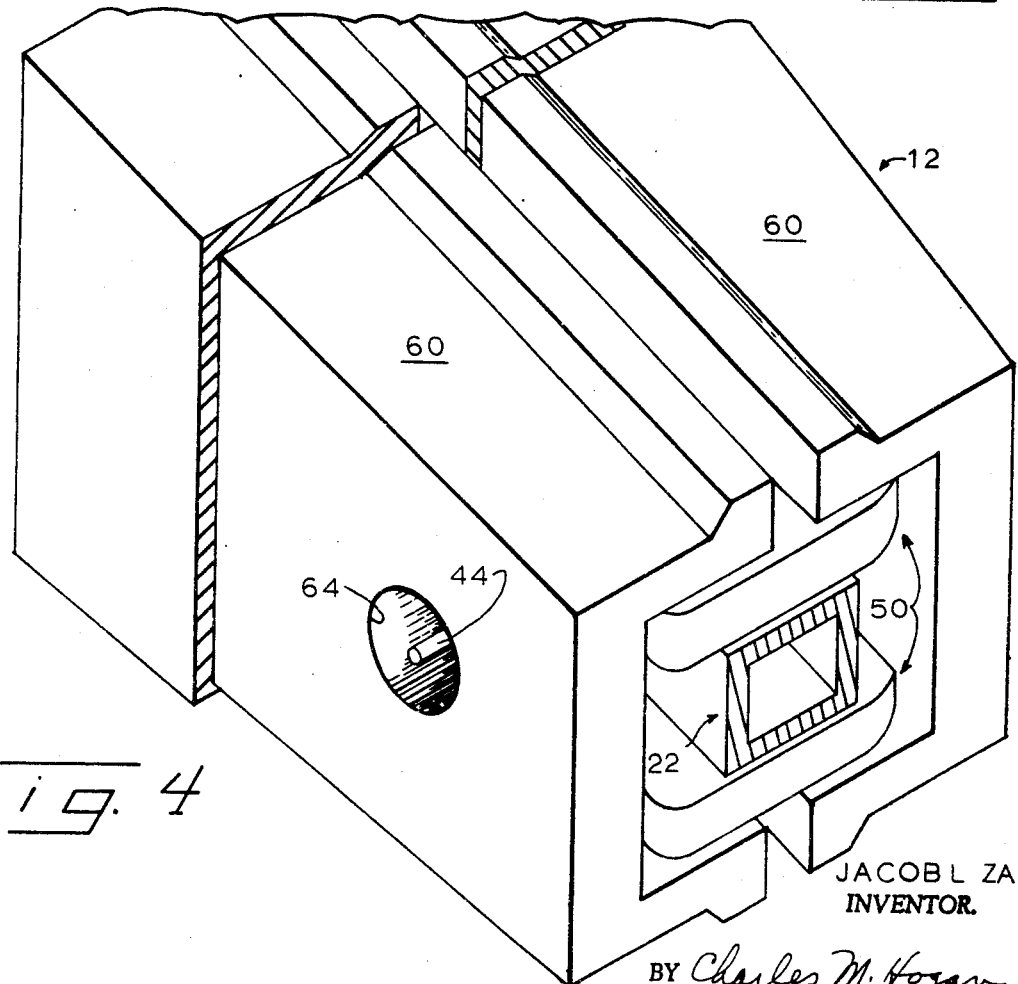
FIG. 4 is a fragmentary, perspective view of the inlet end of a flow channel and magnetic field generator shown in part, in FIGS. 2 and 3.

FIG. 4 illustrates that the described magnetic field generating system 12 may be divergently tapered to follow the contour of the channel 22. The use of a gas flow path which increases in area is a known feature which can be accommodated by the present invention. Likewise coil winding techniques to vary the strength of the magnetic field are well known and form no part of the present invention though it is compatible therewith.

While a preferred form of the invention has been shown and described, many details thereof can be varied within the broader aspects of the present inventive concepts. For example, the frames 60, are described as being of iron; however, other ferromagnetic materials could be used and the term iron includes such materials. Further, while the present disclosure is of a linear type flow path for the conductive fluid, it is to be understood and will be apparent to those skilled in the art that the broader aspects of the invention are applicable to other forms of MHD devices as well as to other forms of flow path for the conductive fluid, as where the fluid is introduced centrally of a flow path which radiates in all directions. The spirit and scope of the present inventive concepts are therefore to be derived from the following claims.

Having thus described the invention, what is claimed as novel and desired to be secured by Letters Patent of the United States is:

1. A magnet comprising
a pair of opposed coils adapted to be energized to create poles of opposite polarity, respectively, therein and
first and second iron frame means of U-shaped cross section, each said frame means comprising a bridge portion and a pair of legs, the extreme ends of said legs being enlarged, said first and second frame means being oppositely disposed and spaced apart whereby the legs of said frame means extend over and embrace said coils, said frame means creating, outside of said coils, poles in said legs which are opposite in polarity to the polarity of the adjacent coils respectively thereby at least substantially reducing the polar forces of said coils when energized, and the enlargement of the ends of said legs provide an essentially uniform strength magnetic field between said coils.

2. A magnet as in claim 1 in further combination with passageway for electrically conductive fluid in an MHD device and
further wherein
said coils are disposed on opposite sides of said passageway and in combination with said first and second frame means create a substantially uniform magnetic field normal to the direction of fluid flow through said passageway.

3. A combination as in claim 2 wherein
said coils are respectively mounted in Dewars having spaced inner and outer casings,
each coil is anchored within the inner casing of its Dewar for the circulation of an extremely low temperature fluid therethrough to provide superconductive flow of current through said coils and
the inner and outer casings are interconnected by elongated spoke rod means for providing a heat conductive path of great length to there-by minimize heat losses.

4. A combination as in claim 2 wherein
said passageway is in the form of an elongated, linear channel for an ionized, hot gas stream in an MHD generator
said coils are disposed above and below said channel and have lengthwise runs disposed generally parallel to said channel, the runs of each coil, being respectively interconnected by bights at their opposite ends, and
said first and second frame means extend substantially the length of said runs and respectively embrace opposed runs of the two coils on opposite sides of the channel.

5. A combination as in claim 3 further comprising
spaced abutment means between the iner and outer casings of each Dewar for limiting relative movement therebetween and thus preventing excessive strain in the spoke rod means.

6. A combination as in claim 3 wherein
each Dewar has a height substantially less than its width and
the spoke rod means for horizontal support comprises a series of spoke rods angled from widthwise corners of the inner casing to the remote widthwise corners of the outer casing and for vertical support comprise spoke rods angled from the vertical corners of the inner casing to intermediate frame means and then to the vertical corners of the outer casing.

7. A combination as in claim 6 further comprising turnbuckles for tensioning said spoke rods 8. A combination as in claim 4 wherein
at least one of said frames has an opening through its bridge portion providing for passage therethrough of service connections to said channel.

* * * * *